L
UNITED STATES PATENT OFFICE.

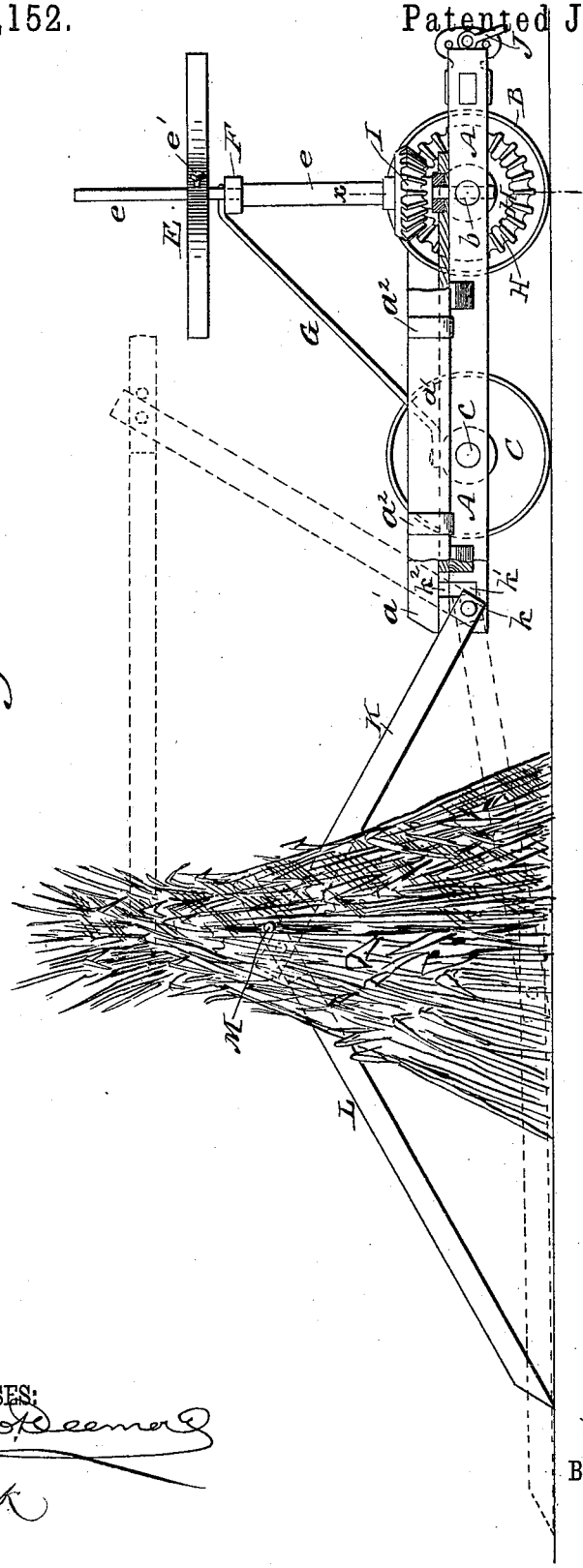

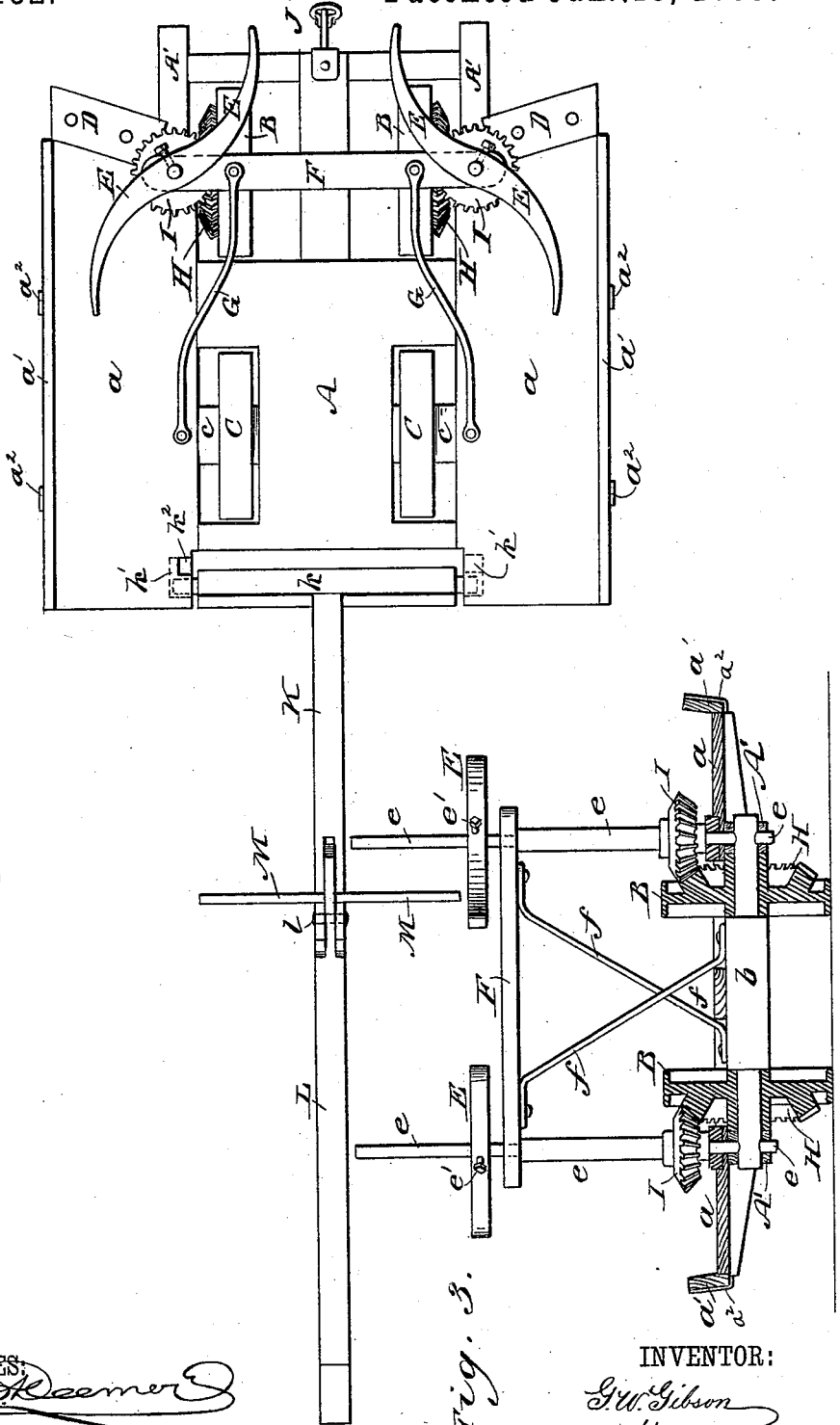

GEORGE W. GIBSON, OF KIMBOLTON, OHIO.

CORN-CUTTER.

SPECIFICATION forming part of Letters Patent No. 396,152, dated January 15, 1889.

Application filed December 24, 1887. Serial No. 258,937. (No model.)

*To all whom it may concern:*

Be it known that I, GEORGE WASHINGTON GIBSON, of Kimbolton, in the county of Guernsey and State of Ohio, have invented a new and Improved Corn-Cutter, of which the following is a full, clear, and exact description.

The invention consists in certain novel features of construction and combinations of parts of the corn-cutter, all as hereinafter described and claimed.

Reference is to be had to the accompanying drawings, forming a part of this specification, in which similar letters of reference indicate corresponding parts in all the figures.

Figure 1 is a side elevation of my improved corn-cutting machine and a shocking attachment therefor. Fig. 2 is a plan view of the machine; and Fig. 3 is a front view of the machine, with parts in cross-section on the line $x$ $x$, Fig. 1.

The machine is made with a suitable frame, A, which is supported on wheels B C, mounted on axles $b$ $c$, fitted in the frame. This frame has side extensions, $a$ $a$, forming horizontal tables, onto which the cornstalks cut by knives D D, fitted at the front edge of the tables, fall or onto which they are laid by the action of two horizontally-revolving reels, E E, which are fitted upon vertical shafts journaled at their lower ends in vertical apertures in the side bars, A' A', of the frame A and in aligning apertures in the outer rounded ends of the front wheel-axle, $b$, and at their upper ends in a head or cross timber, F, which is stayed to the main frame by diagonally-ranging crossed iron brace-bars $f$ $f$. This front axle, $b$, is squared between its round ends, and the lower ends of the brace-bars $f$ $f$ are secured to the upper side of this squared portion. The rounded ends of shaft $b$ are mounted in the side bars of the frame and have vertical apertures through which the lower ends of the shafts $e$ pass, as shown clearly in Fig. 2. A pair of inclined bars, G G, connected at opposite ends to the timber F and to the inner edges of the corn-receiving tables $a$ $a$ near their rear ends, serve the double purpose of bracing the reel-supports against back-pressure and guiding the cut stalks properly onto the tables as they are carried backward and laid over by the reels.

The tables have upwardly-projecting board flanges $a'$ at their outer edges and held thereto, preferably, by strap-irons $a^2$, said flanges forming guards to hold the cut stalks on the tables until they are removed therefrom to form or help form the shocks of corn on the field, as presently explained.

The reels E are shown formed with two opposite curved arms; but they may have three or four arms, if desired, four-armed reels being preferable when cutting drilled corn. The knives D are set with their edges inclined inward toward the rear and center of the machine to cut the corn easily with a shearing action as it is held and pressed to them by the reels, which then lay the cut stalks onto the tables, as above described. The reels are operated from the front wheels, B B, of the machine by means of bevel-gears H on these wheels meshing with bevel-pinions I on the reel-shafts, and as most clearly shown in Fig. 3 of the drawings. The reels E are held to their shafts $e$ by means of set-screws $e'$, allowing them to be adjusted higher or lower as the height of the corn to be cut may require. Any suitable clevis or draft device, J, at the front of the frame A provides for hitching a horse to the machine to draw it along between two rows of corn, which the wheels B C clear, and which will be cut simultaneously by the knives D D at opposite sides of the machine.

The shocking attachment to the corn cutter which I prefer to use as best adapted to my form of cutting-machine (but which is not claimed herein) is composed of but three simple parts—a bar or timber, K, which has a front cross head or piece, $k$, by which it is pivotally connected to the rear end of the machine, a bar or timber, L, which is pivoted at $l$ to the rear end of the bar K, and a stout long pin, M, which, when the device is set up as a support against and around which to build the shock, is passed through a hole in the bar L in front of the pivot $l$ and at the top or back edge of the bar K, and whereby the two bars K L will be locked together in the position shown in full lines in Figs. 1 and 2 of the drawings. The cross-head $k$ of the bar K is preferably connected to the machine-frame A by means of pins or gudgeons on the bar entering slots $k'$ in the frame, one of said slots at one side of the frame being open to a vertical slot, $k^2$, through which one end gudgeon of the bar $k$ is slipped, while the other end rests in the opposite slot $k'$. This connection of the shocker to the machine allows the shocker attachment to be readily applied to and removed from the cutter, and does not interfere with the adjustment of the attachment to either of the two positions indicated by the dotted lines in Fig. 1 of the drawings.

In using the shocker attachment it is connected to the machine-frame A, as above described, and as the cutter is drawn forward, the stalks, severed by the knives D, fall upon the tables $a$ and accumulate thereon in sufficient quantity to form either the center or heart of a corn-shock or a whole shock. The machine will now be stopped and the bars K L, which had been drawn along on the ground in the lowermost position shown in dotted lines in Fig. 1 while the stalks to form the shock were being cut, will be raised into the position shown in full lines behind the now stopped machine, and the pin M will be put in the bar L to hold the bars K L up as a saddle or support to the stalks, which will be taken from the table $a\ a$ and stood butts down around the bars and against their locking-pin M, as shown in full lines in Fig. 1 of the drawings. After all the cut stalks have been stood or piled up in this manner and the shock is tied and the machine is ready to start again through the standing corn the pin M will be withdrawn from the shocker-bar L and the two bars K L will again fall to the lowermost dotted position and will be dragged along the ground while the cornstalks to form the next shock or part of a shock are being cut by the knives D and laid on the tables $a$ by the reels, and when the stalks again accumulate in number sufficient to form the next shock the machine will be stopped and the shocker-bars K L will again be set up and will be locked by the pin M to allow the second shock to be formed against the bars and pin K L M, as before, and so on, the corn being cut by the machine and being carried thereon to the place where the shock is to be formed, thus largely economizing labor over the method of cutting the corn and letting it drop onto the field and afterward gathering it from a considerable area to form each shock. When it is not desired to use the shocker attachment, it may be thrown over forward on its bar $k$, as indicated by the upper dotted lines in Fig. 1 of the drawings, and either in the condition shown or in fully folded condition it may be rested against the rear end, F, of the machine-frame.

The machine may be built with a knife, D, reel E, and table $a$ at one or both sides, as preferred, and it may be operated either from the center or either side of a field of standing corn, as will readily be understood.

Having thus described my invention, what I claim as new, and desire to secure by Letters Patent, is—

The combination, with the machine-frame A, having the forward axle, $b$, the body being square and at its ends round and having vertical apertures within the side bars of the frame, wheels B, turning on said round ends of the axle and provided with gears H, and the side tables, $a\ a$, having fixed knives D, of the vertical shafts $e\ e$, extending at their lower ends down through the apertured side bars of the frame and the apertures in the axle, the gears I on the lower ends of the said shafts meshing into gears H, and the reels E on their upper ends, the cross-bar F, supporting the upper ends of shafts $e$, and the brace-bars G $f$, supporting said bar, the former from the rear of the frame and the latter from the forward axle, substantially as set forth.

GEORGE W. GIBSON.

Witnesses:
JOHN BUMGARDNER,
W. C. MCCONAUGHEY.